(12) United States Patent
Bennett et al.

(10) Patent No.: US 8,841,929 B2
(45) Date of Patent: Sep. 23, 2014

(54) SENSOR SYSTEM FOR STEERING WHEEL FOR VEHICLE

(75) Inventors: Jeffrey Bennett, Brownstown, MI (US); Leonard S. Cech, Brighton, MI (US); Joseph K. Krause, Northville, MI (US)

(73) Assignee: TK Holdings Inc., Auburn Hills, MI (US)

( * ) Notice: Subject to any disclaimer, the term of this patent is extended or adjusted under 35 U.S.C. 154(b) by 313 days.

(21) Appl. No.: 13/529,949

(22) Filed: Jun. 21, 2012

(65) Prior Publication Data
US 2012/0326735 A1    Dec. 27, 2012

Related U.S. Application Data

(60) Provisional application No. 61/500,056, filed on Jun. 22, 2011.

(51) Int. Cl.
*G01R 27/02* (2006.01)
*B62D 1/04* (2006.01)
*B62D 1/06* (2006.01)

(52) U.S. Cl.
CPC . *B62D 1/06* (2013.01); *B62D 1/046* (2013.01)
USPC .......................................... 324/705; 324/600

(58) Field of Classification Search
USPC ................................. 324/600, 705
See application file for complete search history.

(56) References Cited

U.S. PATENT DOCUMENTS

| | | | |
|---|---|---|---|
| 6,563,231 B1 | 5/2003 | Stanley et al. | |
| 7,109,862 B2 | 9/2006 | Braeuchle et al. | |
| 8,011,234 B2 | 9/2011 | Kandler | |
| 2012/0249473 A1* | 10/2012 | Suzuki | 345/174 |

FOREIGN PATENT DOCUMENTS

| | | |
|---|---|---|
| DE | 100 48 956 C1 | 5/2002 |
| DE | 203 09 603 U1 | 9/2003 |
| DE | 10 2006 031 207 B2 | 11/2007 |
| DE | 10 2007 024 141 A1 | 11/2008 |
| DE | 10 2009 055 426 A1 | 12/2009 |
| DE | 10 2009 055 424 A1 | 7/2011 |
| JP | 2007-299048 A | 11/2007 |

(Continued)

OTHER PUBLICATIONS

International Preliminary Report on Patentability with Written Opinion issued Dec. 23, 2013 in connection with International Application No. PCT/US2012/043578.

(Continued)

*Primary Examiner* — Vincent Q Nguyen
(74) *Attorney, Agent, or Firm* — Foley & Lardner LLP

(57) ABSTRACT

A sensor system for a steering wheel of a vehicle includes a first sensor disposed within a first portion of the steering wheel to detect contact with a front left surface of the steering wheel. The sensor system includes a second sensor disposed within a second portion of the steering wheel separate from the first portion to detect contact with a front right surface of the steering wheel. The sensor system also includes a third sensor disposed within the steering wheel to detect contact with a rear surface of the steering wheel. The first, second and third sensors are configured to respectively detect touching of the front left surface, the front right, and the rear surface of the steering wheel by a hand or a non-hand part of an operator of the vehicle. The first, second and third sensors can be complex impedance sensors.

35 Claims, 6 Drawing Sheets

(56) References Cited

FOREIGN PATENT DOCUMENTS

| | | |
|---|---|---|
| JP | 2008-059459 A | 3/2008 |
| JP | 2008-265528 A | 11/2008 |
| WO | WO-2009/083956 A1 | 7/2009 |
| WO | WO 2011/080323 A1 | 7/2011 |
| WO | WO 2011/080324 A1 | 7/2011 |

OTHER PUBLICATIONS

English language abstract DE 10 2011 084 903 filed Oct. 20, 2011.
International Search Report PCT/US2012/043578 dated Dec. 28, 2012.

* cited by examiner

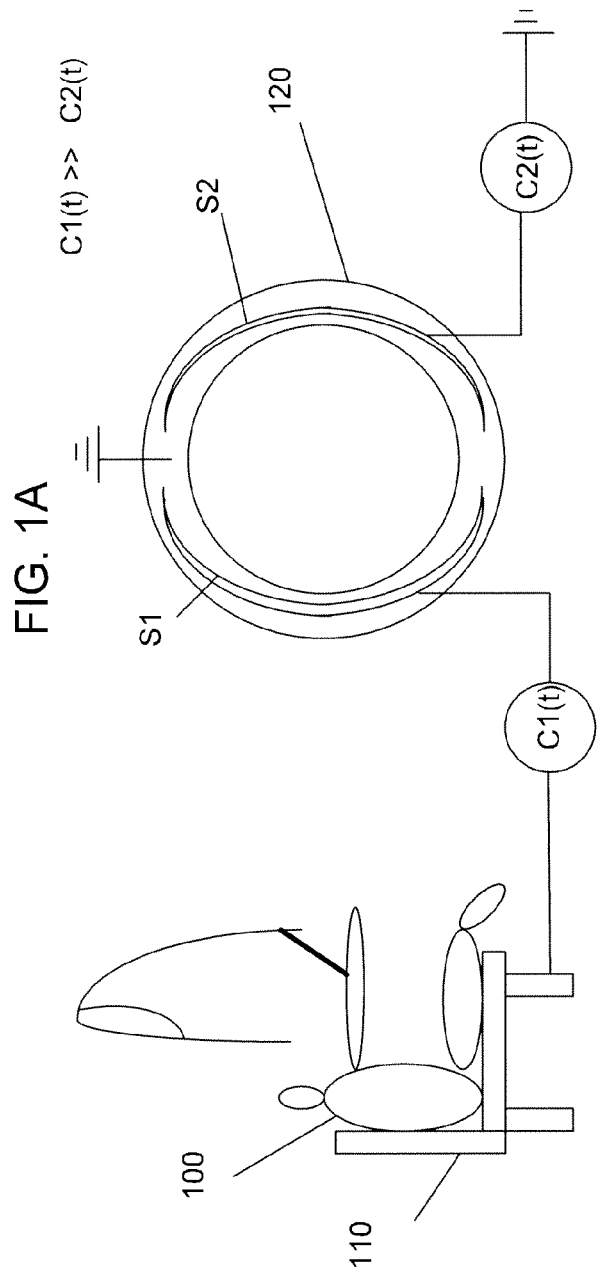

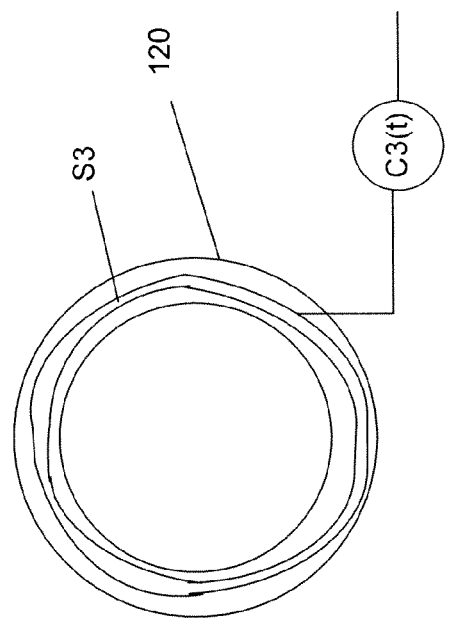

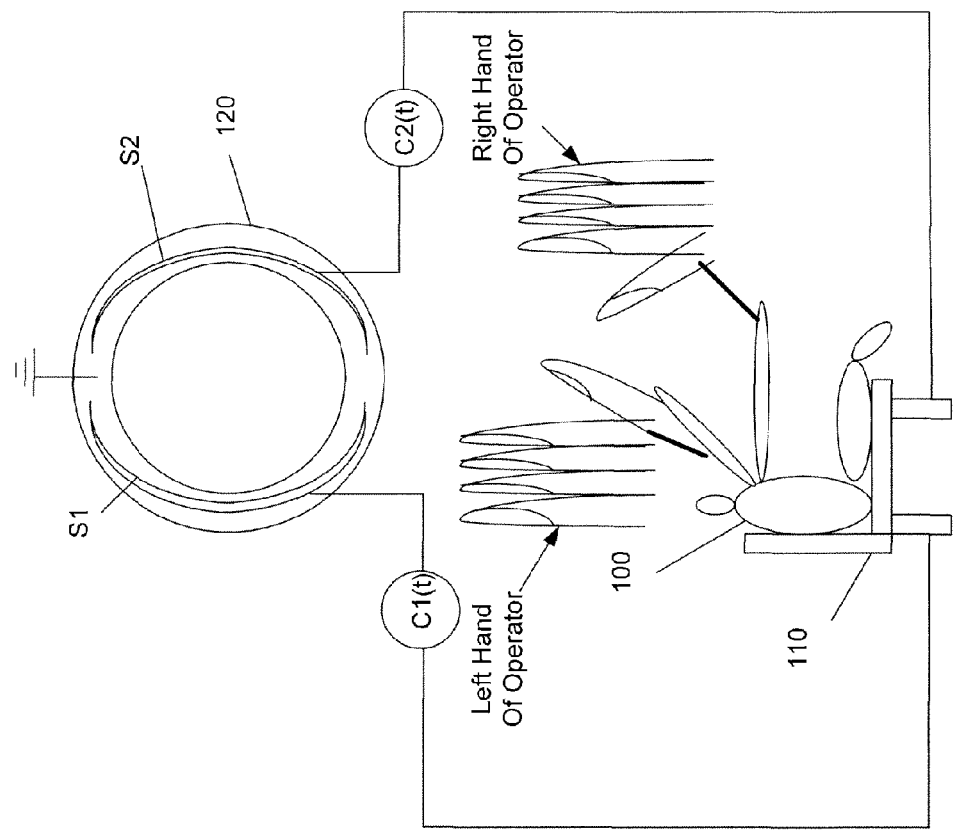

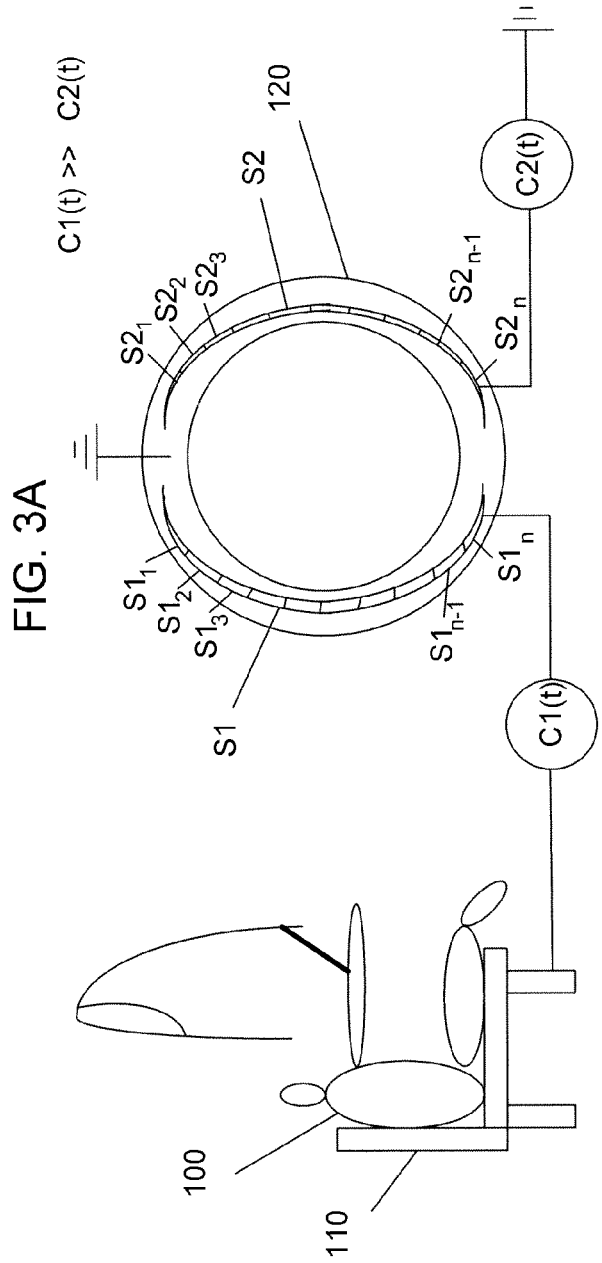

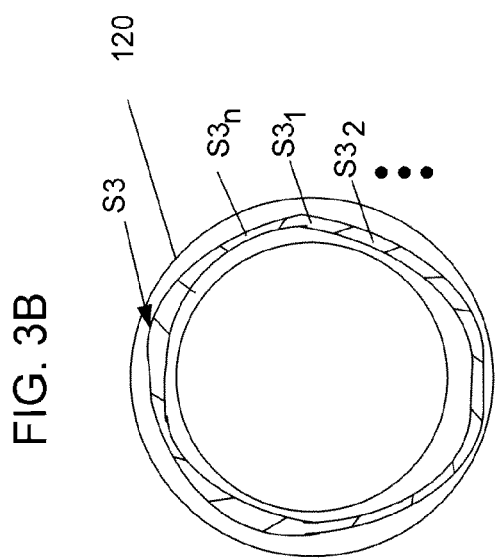

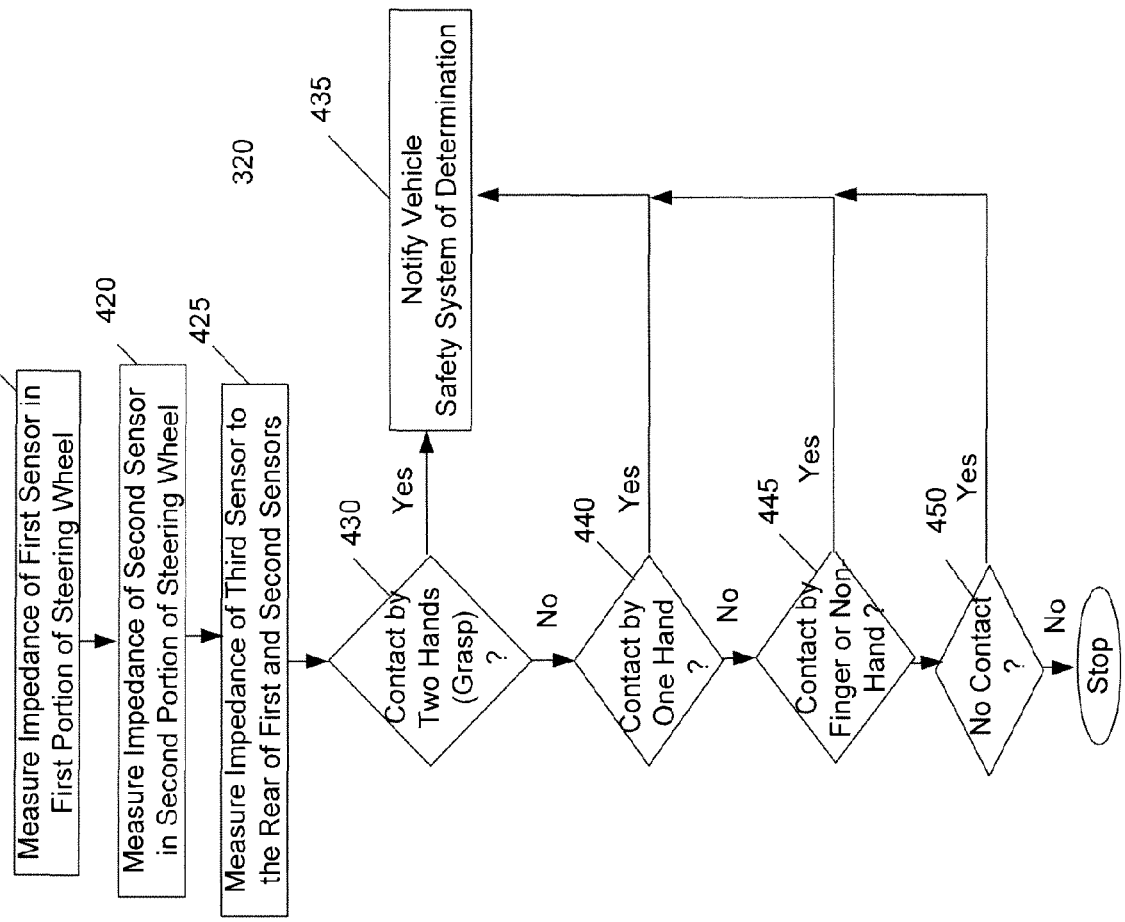

SENSOR SYSTEM FOR STEERING WHEEL FOR VEHICLE

RELATED APPLICATIONS

This application claims priority to U.S. provisional application Ser. No. 61/500,056, entitled SENSOR SYSTEM FOR STEERING WHEEL FOR VEHICLE, FILED Jun. 22, 2011, the contents of which are incorporated in their entirety herein by reference.

BACKGROUND

The present disclosure relates generally to the field of vehicles. The present disclosure more specifically relates to a sensor system in a steering wheel of a vehicle.

Current steering wheel sensor systems which detect hand placement on the steering wheel do not include a way to determine which way the wheel is being controlled (e.g., via a hold, grasp, touch, etc.). Such systems often utilize electric redistribution sensors, where an electric field is induced in a sensor electrode with an accurate voltage, current and frequency profile. Objects within proximity (such as human hands or body parts) tend to redistribute the electric field intensity and phase, resulting in the change of complex impedance as measured within the electric field circuit. The complex impedance can be a capacitance, an inductance, a resistance, or a combination thereof (e.g., a sensor that measures a capacitance component and an inductive component as I and Q components, respectively). What is needed is a system and method for determining when the steering wheel is being controlled through a grasp (e.g., when a hand palm skin surface engages the majority (or all) of the perimeter of the steering wheel rim or spokes).

BRIEF DESCRIPTION OF THE DRAWINGS

The features, aspects, and advantages of the present invention will become apparent from the following description and accompanying exemplary embodiments shown in the drawings, which are briefly described below.

FIG. 1A illustrates a sensor system that detects a finger contact or tap or hand grasp on a steering wheel according to one or more embodiments, in which a cross sectional view of the steering wheel is shown.

FIG. 1B shows a different cross sectional view of the steering wheel of the sensor system of FIG. 1A.

FIG. 2 illustrates a sensor system that detects a hand grasp on a steering wheel according to one or more embodiments.

FIG. 3A illustrates a sensor system that uses small sub sensors to detect a finger contact or a hand grasp on a steering wheel according to one or more embodiments, in which a cross sectional view of the steering wheel is shown.

FIG. 3B shows a different cross sectional view of the steering wheel of the sensor system of FIG. 3A.

FIG. 4 is a flow diagram of a method of detecting different types of contact with a steering wheel according to one or more embodiments.

SUMMARY OF THE INVENTION

In one implementation, there is provided a sensor system for a steering wheel of a vehicle. The sensor system includes a first sensor disposed within a first portion of the steering wheel to detect contact with a left side front surface of the steering wheel, a second sensor disposed within a second portion of the steering wheel separate from the first portion to detect contact with a right side front surface of the steering wheel, and a third sensor disposed within the steering wheel to detect contact with a back surface of the steering wheel (e.g., the surface of the steering wheel furthest from a seat compartment of a driver of the vehicle). The first, second and third sensors are configured to respectively detect contact of the steering wheel by a palm or by a finger (or other non-palm area) of an operator of the vehicle.

In another implementation, there is provided a method of sensing contact on a steering wheel of a vehicle. The method includes measuring impedance of a first sensor disposed within a first portion of the steering wheel to detect contact with a front left side surface of the steering wheel. The method also includes measuring impedance of a second sensor disposed within a second portion of the steering wheel separate from the first portion to detect contact with a front right side surface of the steering wheel. The method also includes measuring impedance of a third sensor disposed within the steering wheel to detect contact with a back surface of the steering wheel. The method further includes determining that the steering wheel is being contacted by two hands of a vehicle operator to indicate a proper grasp of the steering wheel when the respective impedances of the first, second and third sensors are greater than or equal to a threshold impedance level. The method still further includes determining that the steering wheel is being contacted by only one hand or a finger of the vehicle operator when the impedance of the first sensor is greater than or equal to the threshold impedance level and the impedance of the second sensor is less than the threshold impedance level, or when the impedance of the second sensor is greater than or equal to the threshold impedance level and the impedance of the first sensor is less than the threshold impedance level. The method also includes determining that the steering wheel is not being contacted by the vehicle operator when the respective impedances of the first, second and third sensors are less than the threshold impedance level.

DETAILED DESCRIPTION

Complex impedance (e.g., capacitance and inductance, or capacitance and resistance, or inductance and resistance) sensors may be used in vehicle environments (e.g., in the steering wheel of the vehicle) to determine if and where a user (e.g., a driver) of the vehicle is touching the steering wheel. One or more embodiments describe a way to improve the ability of a sensor system including the complex impedance sensors to determine reliably and repeatedly the characteristics of how the driver is controlling the steering wheel. The sensor system determines such characteristics through applied counter forces applied by the driver's body parts on the steering wheel. The sensor system of one or more embodiments distinguishes between a "hands on the wheel" state (e.g., the driver's hands firmly grasping the steering wheel) from other scenarios in which the driver controls the steering wheel through other body parts, the driver inadvertently touches the steering wheel, the driver taps the steering wheel instead of holding or grasping the steering wheel, etc. Further, the sensor system can be used to estimate the applied steering control force of the driver's hands (e.g., the force applied to the steering wheel by the driver) based on hand position or hand location, the number of sensing elements acted on in the steering wheel, and surface area of the hand (or other body parts) applied to the steering wheel. The sensor system may use the signal characteristics of the impedance sensor experiencing a "tap" function to control a vehicle control state switch.

The sensor system may distinguish between various possible control scenarios and other scenarios (e.g., control states). One control state the sensor system may distinguish is if the driver is holding (e.g., grasping) the steering wheel spoke with a hand. A measure of the degree to which the spoke is actually being controlled through the grasp may be made (e.g., via determining the number of hand control points and the percentage of the hand touching each sensor point).

Another control state the sensor system may distinguish is if the driver is holding (e.g., grasping) the steering wheel rim with a hand. A measure of the degree to which the wheel is actually being controlled through the grasp may be made (e.g., via determining the number of hand control points and the percentage of the hand touching each sensor point).

Another control state the sensor system may distinguish is if the driver is restraining the steering wheel using a body part other than the hand (e.g., a finger, knee, stomach, forearm, or another body part). The sensor system can distinguish that there is no grasp on the steering wheel associated with the body part.

Another control state the sensor system may distinguish is if the driver "taps" the steering wheel, indicating a request to change a control state of the vehicle. The sensor system may distinguish between such a tap, an inadvertent touching of the steering wheel, and a hold or grasp event described above.

The sensor system according to one or more embodiments includes complex impedance sensor elements provided on or within the steering wheel rim and/or spokes. The sensor elements are arranged in the steering wheel such that the raw and/or signal conditions of the sensor element signal or derivative(s) of the signal can be used directly and/or compared in an algorithm to determine steering wheel states (e.g., "hands on the wheel", the steering wheel being operated by another body part, the steering wheel being tapped, etc.). The position, size, and sensitivity of the sensor elements can be configured in such a way as to distinguish between control states.

A complex impedance sensor may output in-phase and quadrature components of a current based on sensed capacitance and sensed inductance of an object being sensed (e.g., a finger of a human hand or a palm of a human hand). Such types of complex impedance sensors are described in U.S. Patent Publication 2007/0192007, which is assigned to the same assignee as this application and which is incorporated in its entirely herein by reference.

Referring to FIGS. 1A, 1B and 2, which show a steering wheel sensor system according to some embodiments with a steering wheel 120 in cross-sectional view, possible sensor element locations are shown in greater detail. Referring to FIGS. 1A and 1B, three sensor elements S1, S2 and S3 are shown, whereby the cross section view of FIG. 1B is closer to the back of the steering wheel (that is, further from a driver's seat within a passenger compartment) than the cross section view of FIG. 1A. The sensor elements S1, S2 and S3 are positioned on a steering wheel rim surface and are isolated electronically using one or more separate sensors or shields (not shown). The shield may be optional if there is a need to isolate the sensor elements, heater elements, and other elements within the steering wheel. In FIG. 1A, the sensor elements S1 and S2 are installed in between the steering wheel cover (e.g. a leather or plastic material, etc.) and the interior of the steering wheel (e.g., foam, armature, etc.), to detect contact with a front left side surface and a front right side surface of the steering wheel, respectively. In FIG. 1B, the sensor element S3 is disposed in the rear of the first and sensor elements S1, S2, to detect contact with a rear surface of the steering wheel 120. In the embodiment of FIGS. 1A and 1B, the driver 100 tapping or touching the front surface of the left side of the steering wheel 120 as viewed in a direction of the driver's seat will induce a impedance signal change from the first sensor element S1 as the driver's body and seat assembly 110 is coupled into the circuit. The tap will induce little signal in the second sensor element S2 that is disposed on the right side of the steering wheel as viewed in a direction of the driver's seat, and it will induce little signal in the third sensor element S3 that is disposed in the back of the first and second sensor elements S1, S2 to detect contact with the hack surface of the steering wheel 120. The sensor system may compare the impedance values $C1(t)$, $C2(t)$ and $C3(t)$ of the sensor elements S1, S2 and S3 to determine that the driver 100 is tapping the steering wheel 120 (instead of, for example, grasping the steering wheel 120) and what portion of the steering wheel the driver is tapping (e.g., front left, front right, or back).

When the driver 100 is making contact with the first sensor S1, the impedance value $C1(t)$ of the first sensor S1 increases from its non-contact state impedance value. As such, when the impedance value $C1(t)$ is determined to be much greater than the impedance value $C2(t)$ of the second sensor S2, this indicates that the driver 100 is contacting only the front left side surface of the steering wheel 120, and not the front right side surface of the steering wheel 120. In this state, the second sensor S2 is connected to ground at both ends, and the first sensor S1 is connected to ground at one end and to the driver 100 (with a particular impedance value associated with a human finger or palm) at another end. As such, the first sensor S1 outputs a fairly high impedance value $C1(t)$ indicative of contact being made by a human body part of the driver 100, and the second sensor S2 outputs a fairly low impedance value $C2(t)$ indicative of no contact being made by a human body part of the driver 100. This signifies that the driver 100 is making contact with only a finger or palm of one hand on one side (e.g., the left side or the right side) of the steering wheel 120, and not using both hands on the steering wheel 120 (and thus making contact with both the left and right sides of the vehicle). Based on the impedance value $C3(t)$ of the third sensor S3, it can be determined if the contact is via a finger or other non-palm portion of the driver (when the impedance value $C3(t)$ is low), or if the contact is via a hand grasp (when the impedance value $C3(t)$ is high). Any non-grasp contact can be considered to be a non-safe vehicle driving state, whereby the non-safe vehicle driving state may result in an alert being output by a vehicle safety system, such by an audible alert (e.g., "Please put both hands on the steering wheel") or a visual alert (a display on the dashboard of the vehicle outputs a message "Please put both hands on the steering wheel"), or both.

Referring now to FIG. 2, the driver 100 is grasping the steering wheel 120 with both his/her left and right hands, and the sensor elements S1, S2 and S3 are each coupled into the body and seat components 110 of the vehicle (for sensor S3, see FIG. 1B). Therefore, the sensor elements S1, S2 and S3 will experience a similar impedance value $C1(t)$, $C2(t)$ and $C3(t)$ compared with a situation where the steering wheel 120 is not being touched, tapped, or grasped. That is, the first, second and third sensor elements S1, S2 and S3 have a respective impedance value $C1(t)$, $C2(t)$ and $C3(t)$ indicative of contact being made to the first, second and third sensor elements S1, S2 and S3 by a human body part, which in this case is indicative of a hand grasp on the steering wheel. The sensor system may compare the impedance values of the sensor elements S1, S2 and S3 to determine that the driver 100 is grasping the steering wheel 120 (instead of, for example, merely tapping the steering wheel 120), when the first, second and third sensor elements S1, S2 and S3 have an impedance value $C1(t)$, $C2(t)$ and $C3(t)$ greater than a predetermined impedance value (e.g., greater than 10 picofarads).

The human body has a typical impedance in the range of from tens of picofarads to hundreds of picofarads, and this is the impedance value that can be detected from the first, second and third sensor elements S1, S2 and S3 to indicate contact with a human body part (e.g., a finger or palm of a vehicle operator). When no human contact is being made to the first, second and third sensor elements S1, S2 and S3, the impedance values $C1(t)$, $C2(t)$ and $C3(t)$ output by those sensor elements S1, S2 and S3 is on the order of zero (0) farads. When the first, second and third sensors S1, S2 and S3 have a respective impedance value $C1(t)$, $C2(t)$ and $C3(t)$ greater than a predetermined value and approximately equal to each other, this is indicative of a vehicle operator having both hands grasping the steering wheel, thereby indicating a safe driving condition.

In further implementations, contact made to a sensor S1 or S2 by a finger of the driver 100 causes the sensor S1 or S2 to have an impedance value of approximately a first non-zero impedance value and the sensor S3 to have an impedance value of approximately zero (since the finger contact is only with a front surface of the steering wheel), and contact made to a sensor S1 or S2 by a palm of the driver 100 causes the sensor S1 or S2 to have an impedance value of approximately a second impedance value greater than the first impedance value and the sensor S3 to have an impedance value of approximately the second impedance value (since a normal hand grasp makes contact with both the front and back surfaces of the steering wheel), and whereby the particular mode of contact to the first and second sensors S1, S2 and S3 can be determined accordingly. For example, for an example having sensors that measure capacitance, if the first sensor S1 has a impedance value $C1(t)$ of 15 picofarads that is indicative of a finger of a human hand being touched to the first second sensor S1, and if the second sensor S2 and the third sensor S3 each has an impedance value $C2(t)$ of 110 picofarads that is indicative of a palm of a human hand being touched to the second sensor S2 and the third sensor S3, this can be output by a vehicle safety control unit (not shown) to determine if a warning or alert should be made to the driver 100.

The determination of appropriate values of impedances of the first, second and third sensors S1, S2 and S3 to determine finger contact, palm contact, or other type of contact, can be determined based on data stored in a database of historical data obtained from experiments made using known types of human touches to sensors and impedances measured from those known types of human touches. By way of example and not by way of limitation, for sensors that measure capacitance, impedances between 5 picofarads and 50 picofarads are indicative of a finger contact to a sensor, and impedances of between 100 picofarads and 300 picofarads are indicative of a palm or hand contact to a sensor, and whereby impedances of between 50 to 100 picofarads are in an "uncertain" range that may be indicative of one of these two types of contacts.

While the embodiments of FIGS. 1A, 1B and 2 show three sensor elements S1, S2 and S3, other embodiments may include additional sensor elements in the steering wheel rim to further discriminate the holding area and rate at which the holding or grasping of the steering wheel changes (e.g., by comparing signals and signal rates from contiguous sensors, as received and analyzed by a processor, not shown). Further, while the embodiments of FIGS. 1A, 1B and 2 show the sensor elements installed in (e.g., embedded within) the rim of the steering wheel 120, the sensor elements can be installed in (e.g., embedded within) the hub of the steering wheel 120, spokes, or any combination of steering wheel rim, hub, and spokes in order to detect additional information about how the driver is interacting with the steering wheel.

The implementation of the sensor elements of the sensor system may be based on steering wheel design (e.g., the number of spokes, dimensions, type of material, etc.), sensing requirements (e.g., if the sensor system needs to be able to detect a "hands on wheel" state), and on engineering and manufacturing requirements regarding the number, position, material, size, and shape of the sensor elements and the received sensor element signals.

FIG. 3A shows a steering wheel sensor system according to another embodiment in cross section view of the steering wheel, in which the first sensor S1 is shown as first through Nth subsensors $S1_1, \ldots, S1_n$, and in which the second sensor S2 is shown as first through Nth subsensors $S2_1, \ldots, S2_n$. FIG. 3B shows the steering wheel cross section to the rear of the cross section view of FIG. 3A, in which the third sensor S3 is shown as first through Nth subsensors $S3_1, \ldots, S3_n$. By having subsensors that each detects contact with a small portion of the steering wheel, e.g., a 1 inch by 1 inch area on the outer surface of the steering wheel 120, a determination can be made as to whether the driver 100 is contacting the steering wheel 120 with a palm of his/her hand, in which case more than one of the first, second or third subsensors will have an impedance value indicating human contact, or whether the driver 100 is contact the steering wheel 120 with only a finger of his/her hand, in which case only one of the first, second or third subsensors will have an impedance value indicating human contact. This information can further bolster the impedances values measured at any moment in time, to determine the type of contact being made to the steering wheel 120 by the driver 100, such as contact made by way of a finger of a hand or contact made by way of a palm of a hand.

FIG. 4 is a flow diagram of a method of sensing contact with a steering wheel of a vehicle, according to an embodiment. In block 410, an impedance of a first sensor disposed within a first portion of the steering wheel is measured to detect contact with a front left side surface of the steering wheel. In block 420, an impedance of a second sensor disposed within a second portion of the steering wheel separate from the first portion is measured to detect contact with a front right side surface of the steering wheel. In block 425, an impedance of a third sensor disposed within the steering wheel to the rear of the first and second sensors is measured to detect contact with a back surface of the steering wheel (the surface furthest from the vehicle operator). In block 430, a determination is made that the steering wheel is being contacted by two hands of a vehicle operator to indicate a hand grasp made by the operator to the steering wheel when the respective impedances of the first, second and third sensors are greater than or equal to a threshold impedance level, and if so, that determination is provided to vehicle safety system in block 435. If not, in block 440, a determination is made that the steering wheel is being contacted by only one hand of the vehicle operator when the impedance of the first sensor is greater than or equal to the threshold impedance level and the impedance of the second sensor is less than the threshold impedance level and the impedance of the third sensor is greater than the threshold impedance level (left side grasp of steering wheel), or when the impedance of the second sensor is greater than or equal to the threshold impedance level and the impedance of the first sensor is less than the threshold impedance level and the impedance of the third sensor is greater than the threshold impedance level (right side grasp of the steering wheel), and if so, that determination is provided to the vehicle safety system in block 435. If not, in block 445, a determination is made that the steering wheel is being contacted by a finger or other non-palm portion of the vehicle operator when the impedance of the first sensor is at a non-zero impedance level (e.g., a second threshold impedance level) that is less than or equal to the threshold impedance level and the impedance of the second sensor and the impedance of the third sensor are approximately zero (left side touch by non-hand portion of vehicle operator), or when the impedance of the second sensor is at a non-zero impedance level (e.g., the second threshold impedance level) that is less than or equal to the threshold impedance level and the impedance of the first sensor and the impedance of the third sensor are approximately zero (right side touch by non-hand portion of vehicle operator). Also, if the output of block 445 is Yes, a rate of change function may be enabled (see further description below) to determine if a tapping or swiping operation is being made by the vehicle operator to cause a change in vehicle operation state. If not, in block 450, a determination is made that the steering wheel is not being contacted by the vehicle operator when the respective impedances of the first, second and third sensors are approximately zero, and if so, that determination is provided to the vehicle safety system in block 435.

By having first, second and third sensors S1, S2 and S3 provided on a steering wheel in a manner as described above with respect to some embodiments, it can be determined whether a hand grasp is being made to the steering wheel by an operator of the vehicle, or a contact other than a hand grasp is currently being made by the operator, and also what portion of the steering wheel contact is being made to. Also, by having the first sensor S1 provided on one side (e.g., the left side) of the steering wheel to detect contact with a front left side surface of the steering wheel, by having the second sensor S2 provided on the other side (e.g., the right side) of the steering wheel to detect contact with a front right side surface of the steering wheel, and by having the third sensor S3 provided within the steering wheel to detect contact with a rear surface of the steering wheel, it can be detected as to which portion or portions of the steering wheel the operator is currently making contact with. Thus, for example, it can be determined if the operator is currently grasping the steering wheel with only his/her left palm, or with only his/her right palm, or with only his/her left finger and his right palm, or with only his/her left palm and his right finger, or with only his/her left finger and his/her right finger, or with only his/her left finger (or other non-palm body part), or with only his/her right finger (or other non-palm body part).

While not shown in the figures, the sensor system may include control circuitry or modules for using the signals from the sensor elements to determine various control states (e.g., touch, tap hold, or grasp scenarios or states) of the steering wheel. For example, the sensor system may include control circuitry including detection algorithms used to determine the control state. The sensor system may further include various signal processing modules to process the signals. For example, a left side surface tap or swipe of the steering wheel by a body part of the vehicle operator (e.g., a finger, an elbow, etc.) can be detected by measuring impedances of the first, second and third sensors (e.g., first sensor has an impedance value indicating contact, and the second and third sensors have a zero impedance value indicating no contact), and by detecting a rate of change of the impedances of the first, second and third sensors (such as to detect tapping made to by the vehicle operator on a front left side surface the steering wheel to change a vehicle operating state). Similarly, a right side surface tap or swipe of the steering wheel by a body part of the vehicle operator (e.g., a finger, an elbow, etc.) can be detected by measuring impedances of the first, second and third sensors (e.g., second sensor has an impedance value indicating contact, and the first and third sensors have a zero impedance value indicating no contact), and by detecting a rate of change of the impedances of the first, second and third sensors (such as to detect tapping made to by the vehicle operator on a front right side surface the steering wheel to change a vehicle operating state).

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter. For example, the impedance sensors may be replaced with inductive sensors in another possible implementation, in which an inductive signal level may be measured to determines types of touching being made to a steering wheel. In yet another implementation, the impedance sensors may be replaced with capacitive sensors, and in yet another implementation the impedance sensors may be replaced with resistive sensors. In still another implementation, the impedance sensors may be replaced with capacitive and resistive sensors, or inductive and resistive sensors, or capacitive and inductive and resistive sensors.

The invention claimed is:

1. A sensor system for a steering wheel of a vehicle, comprising:
   a first sensor disposed within a left side portion of the steering wheel and configured to detect contact with a front left side surface of the steering wheel; and
   a second sensor disposed within a right side portion of the steering wheel separate from the first portion and configured to detect contact with a front right side surface of the steering wheel; and
   a third sensor disposed within the steering wheel to detect contact with a rear surface of the steering wheel,
   wherein the first, second and third sensors are configured to respectively detect contact with the front left side, front right side, and rear surfaces to indicate a hand grasp to the steering wheel made by an operator of the vehicle versus another body part contact to the steering wheel made by the operator of the vehicle.

2. The sensor system according to claim 1, wherein the first, second and third sensors are complex impedance sensors.

3. The sensor system according to claim 2, wherein the first, second and third sensors are connected to a seat compartment within the vehicle to provide a voltage ground connection to the first, second and third sensors.

4. The sensor system according to claim 1, wherein the first sensor is disposed within a left side region of the steering wheel with respect to a direction in which the operator of the vehicle is located when seated in a vehicle operator seat within a passenger compartment of the vehicle, and
   wherein the second sensor is disposed within a right side region of the steering wheel with respect to the direction in which the operator of the vehicle is located, and
   wherein the third sensor is disposed within both the left side and right side regions of the steering wheel and rearward of the disposition of the first and second sensors with respect to the vehicle operator seat.

5. The sensor system according to claim 1, wherein the first, second and third sensors output a signal of a first signal strength when the first and second sensors are being contacted by a hand grasp of the operator, and
   wherein the first, second and third sensors output a signal of a second signal strength less than the first signal strength when the first and second sensors are being contacted by another body part of the operator different than a hand grasp or when the first, second and third sensors are not being contacted by the operator.

6. The sensor system according to claim 1, wherein the first, second and third sensors are configured to measure a force applied to the steering wheel by the operator of the vehicle based on a signal strength of first, second and third signals output by the first and second sensors when contacted by the operator.

7. The sensor system according to claim 1, wherein the operator of the vehicle is determined to be contacting the steering wheel with a hand grasp of the operator when the first, second and third sensors respectively output first, second and third signals indicating contact being made to the first, second and third sensors at a same moment in time.

8. The sensor system according to claim 1, wherein the operator of the vehicle is determined to be contacting the steering wheel with a body part of the operator different from a hand grasp when the first, second and third sensors respectively output first, second and third signals indicating contact being made to only one or two of the first, second and third sensors at a same moment in time.

9. The sensor system according to claim 8, wherein the operator of the vehicle is determined to be contacting the steering wheel with a body part of the operator different from a hand grasp when either the first signal is greater than the second signal or when the second signal is greater than the first signal.

10. The sensor system according to claim 1, wherein the operator of the vehicle is determined to be contacting the steering wheel with a body part of the operator different from a hand gasp to cause a control state of the vehicle to change when the first and second sensors respectively output first and second signals indicating contact being made to only one of the first and second sensors at a same moment in time.

11. The sensor system according to claim 10, wherein the operator of the vehicle is determined to be contacting the steering wheel with a body part of the operator different from a hand grasp when the first and second signals are approximately equal to each other at a same moment in time and when the third signal is not equal to the first and second signals at the same moment in time.

12. The sensor system according to claim 1, wherein the first sensor comprises a plurality of first subsensors disposed at different locations in the left side portion of the steering wheel, and
    wherein the second sensor comprises a plurality of second subsensors disposed at different locations in the right side portion of the steering wheel.

13. The sensor system according to claim 1, wherein the first, second and third sensors each include heat measuring elements configured to determine a level of heat applied to the first, second and third sensors.

14. The sensor system according to claim 1, further comprising first and second electrical shields provided within the steering wheel, wherein the first and second sensors are electrically isolated from each other by the first electrical shield provided therebetween, wherein the third sensor is electrically isolated from the first and second sensors by the second electrical shield provided therebetween.

15. The sensor system according to claim 1, wherein the first, second and third sensors are disposed in between a steering wheel cover and the steering wheel.

16. The sensor system according to claim 1, wherein the first, second and third sensors are disposed within an interior region of the steering wheel.

17. The sensor system according to claim 1, further comprising:
    a processor unit configured to determine a rate of change of contact made to the first and second sensors over a period of time, to determine whether a swipe contact or a steady contact is being made to the steering wheel.

18. A method of sensing contact on a steering wheel of a vehicle, comprising:
    measuring impedance of a first sensor disposed within a first portion of the steering wheel to detect contact with a front left side surface of the steering wheel; and
    measuring impedance of a second sensor disposed within a second portion of the steering wheel separate from the first portion to detect contact with a front left side surface of the steering wheel;
    measuring impedance of a third sensor disposed within a third portion of the steering wheel separate from the first and second portions to detect contact with a back surface of the steering wheel;
    determining that the steering wheel is being contacted by two hands of a vehicle operator when the respective impedances of the first, second and third sensors are greater than or equal to a threshold impedance level; and determining that the steering wheel is being contacted by only one hand of the vehicle operator when the impedance of each of the first sensor and the third sensor is greater than or equal to the threshold impedance level and the impedance of the second sensor is less than the threshold impedance level, or when the impedance of each of the second sensor and the third sensor is greater than or equal to the threshold impedance level and the impedance of the first sensor is less than the threshold impedance level;

determining that the steering wheel is being contacted by a non-hand portion of the vehicle operator when the impedance of either the first or second sensor is a non-zero level less than the threshold impedance level and the impedance of the third sensor is a zero or approximately zero level; and determining that the steering wheel is not being contacted by the vehicle operator when the respective impedances of the first, second and third sensors is at a zero or approximately zero level.

19. The method according to claim 18, wherein the third sensor is disposed within the steering wheel rearward of the first and second sensors, with respect to a vehicle operator seat within a passenger compartment of the vehicle.

20. The method according to claim 18, wherein the first, second and third sensors output a signal of a first signal strength when the first, second and third sensors are contacted by a hand grasp of the operator, and wherein at least one of the first, second and third sensors output a signal of a second signal strength different than the first signal strength when the at least one of the first, second and third sensors are contacted in a manner other than a hand grasp of the operator.

21. The method according to claim 18, wherein the first, second and third sensors are configured to measure a force applied to the steering wheel by the operator of the vehicle based on a signal strength of first, second and third signals output by the first, second and third sensors when contacted by the operator.

22. The method according to claim 18, further comprising:
determining that the operator of the vehicle is contacting the steering wheel with a hand grasp of the operator when the first, second and third sensors respectively output first, second and third signals indicating contact being made to the first, second and third sensors at a same moment in time.

23. The method according to claim 18, further comprising:
determining that the operator of the vehicle is contacting the steering wheel in a manner other than a hand grasp when the first, second and third sensors respectively output first, second and third signals indicating contact being made to less than all of the first, second and third sensors at a same moment in time.

24. The method according to claim 18, further comprising:
determining that the operator of the vehicle is contacting the steering wheel in a manner other than a hand grasp when either the first signal is different than the second signal or when the second signal is different than the first signal at a same moment in time.

25. The method according to claim 18, further comprising:
determining that the operator of the vehicle is contacting the steering wheel in a manner other than a hand grasp to cause a control state of the vehicle to change when the first and second sensors respectively output first and second signals indicating contact being made to only one of the first and second sensors at a same moment in time.

26. The method according to claim 25, the determining further comprising:
determining that the operator of the vehicle is contacting the steering wheel in a manner other than a hand grasp when the first and second signals are approximately equal to each other at a same moment in time and when the third signal is not equal to the first and second signals at the same moment in time.

27. The methods according to claim 18, wherein the first sensor comprises a plurality of first subsensors disposed at different locations in the first portion of the steering wheel, and wherein the second sensor comprises a plurality of second subsensors disposed at different locations in the second portion of the steering wheel, wherein the third sensor comprises a plurality of third subsensors disposed at different locations in a portion of the steering wheel rearward of the first and second subsensors with respect to a vehicle operator seat within a passenger compartment of the vehicle, wherein the first, second and third subsensors are configured to provide grip detection and swipe rate.

28. The method according to claim 18, wherein the first, second and third sensors include heat measuring elements configured to determine a level of heat applied to the first, second and third sensors.

29. The method according to claim 28, wherein the heat measuring elements are configured to output a signal indicating human contact being made to the first, second and third sensors when the level of heat is greater than a predetermined level of heat.

30. The method according to claim 29, wherein the predetermined level of heat corresponds to a normal body temperature of a human.

31. The method according to claim 18, wherein the first and second sensors are electrically isolated from each other by way of a first electrical shield disposed therebetween within the steering wheel, and wherein the third sensor is electrically isolated from the first and second sensors by way of a second electrical shield disposed therebetween within the steering wheel.

32. The method according to claim 18, wherein the first, second and third sensors are disposed in between a steering wheel cover and the steering wheel.

33. The method according to claim 18, wherein the first, second and third sensors are disposed within an interior region of the steering wheel.

34. The method according to claim 18, wherein the first, second and third sensors are connected to a scat compartment within the vehicle to provide a voltage ground connection to the first and second sensors.

35. The method according to claim 18, further comprising:
determining a rate of change of contact made to the first, second and third sensors over a period of time, to determine whether a swipe contact or a steady contact is being made to the steering wheel.

* * * * *